US008768001B2

(12) United States Patent
Wong et al.

(10) Patent No.: US 8,768,001 B2
(45) Date of Patent: Jul. 1, 2014

(54) APPARATUS AND METHODS FOR GENERATING AND PROCESSING MANGA-STYLE IMAGES

(75) Inventors: Tien-Tsin Wong, Hong Kong (CN); Yingge Qu, Hong Kong (CN); Wai-Man Pang, Hong Kong (CN); Pheng-Ann Heng, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 783 days.

(21) Appl. No.: 12/928,401

(22) Filed: Dec. 10, 2010

(65) Prior Publication Data

US 2011/0148897 A1    Jun. 23, 2011

Related U.S. Application Data

(60) Provisional application No. 61/285,480, filed on Dec. 10, 2009.

(51) Int. Cl.
*G06K 9/00* (2006.01)
*G06T 11/00* (2006.01)

(52) U.S. Cl.
CPC .................. *G06T 11/001* (2013.01)
USPC ....................................... 382/100

(58) Field of Classification Search
None
See application file for complete search history.

(56) References Cited

U.S. PATENT DOCUMENTS

2005/0226502 A1* 10/2005 Cohen et al. .................. 382/173
2011/0187721 A1*  8/2011 Furukawa et al. ............ 345/443

FOREIGN PATENT DOCUMENTS

JP    PCT/JP2008/072272    *  8/2009    ............. G06T 11/80

OTHER PUBLICATIONS

Cox, et al. "Multidimensional Scaling," Chapman & Hall, 1994.
Curtis, C. "Non-Photorealistic Animation," ACM SIGGRAPH 1999 Course 17, Section 9—"Non-Photorealistic Rendering," 1999.
Gooch, et al. "Human Facial Illustrations: Creation and Psychophysical Evaluation," ACM Transactions on Graphics, vol. 23, No. 1, pp. 27-44, Jan. 2004.
Winnemöller, et al. "Real-time Video Abstraction," Proceedings of ACM SIGGRAPH 2006, ACM Transactions on Graphics, vol. 25, No. 3, pp. 1221-1226, 2006.
Chen, et al. "Example-Based Composite Sketching of Human Portraits," Proc. of International Symposium on Non-Photorealistic Animation and Rendering, (NPAR), pp. 95-153, 2004.
Meer, P, et al. "Edge Detection with Embedded Confidence," IEEE Transactions on Pattern Analysis and Machine Intelligence, vol. 23, No. 12, pp. 1351-1365, Dec. 2001.
Raskar, R. et al., "Nonphotorealistic Camera: Depth Edge Detection and Stylized Rendering Using Multi-Flash Imaging," ACM Transactions on Graphics, vol. 23, No. 3, pp. 679-688, Aug. 2004.
Santella, et al. "Visual interest and NPR: an Evaluation and Manifesto," Proc. of International Symposium on Non-Photorealistic Animation and Rendering (NPAR), pp. 71-78, 2004.

* cited by examiner

*Primary Examiner* — Atiba O Fitzpatrick
(74) *Attorney, Agent, or Firm* — Knobbe, Martens, Olson & Bear, LLP

(57) ABSTRACT

The disclosure relates to apparatus and methods for processing images. The method for generating a manga-style image from an input image comprises: generating a line drawing from the input image; generating a manga-style screening from an input image; and overlaying the line drawing and the manga-style screening to generate the manga-style image. The method can provide a high efficient way for auto-generating manga images.

17 Claims, 16 Drawing Sheets

APPARATUS AND METHODS FOR GENERATING AND PROCESSING MANGA-STYLE IMAGES

This application claims the benefit of U.S. provisional patent application No. 61/285,480 filed on Dec. 10, 2009 which is explicitly incorporated by reference in its entirety as part of this application.

TECHNICAL FIELD

The disclosure relates to apparatus and methods for processing images.

BACKGROUND

Manga, or comic, is a popular art form and medium of entertainment over the world. It is unique in its elegant use of rich sets of screens, and a tidy and fine drawing style.

FIG. 1 shows the typical workflow of manga background production. First, artists decide the perspective and roughly sketch the major structure of the scene with pencils (Step 101). Next, they finalize the line drawing with ink (Step 102). With the precise lines in place, artists then begin the screening procedure. They select the appropriate screen papers to express shading, tone, texture, or atmosphere. The screen is overlaid on the target region, and then it is carefully cut along the boundaries and pasted on the region (Step 103), until all the regions are overlaid with their screens. After that, the final manuscript is ready for print (Step 104).

Such a line drawing and screening process done by manga artists is tedious and labor intensive. The task is rather tedious and labor-intensive, especially when large amount of irregular regions exist.

Therefore, it is required to provide a computer-assisted method for converting color photographs to manga-style images.

SUMMARY

One aspect of the disclosure is to provide a method of generating a manga-style image from an input image, comprising: generating a line drawing from the input image; generating a manga-style screening from an input image; and overlaying the line drawing and the manga-style screening to generate the manga-style image.

Another aspect of the disclosure is to provide an image processing apparatus, comprising: an image inputting section for inputting an image; a line drawing section for generating structure lines from the input image; a screening section for generating manga-stytle screening from the input image; and an image outputting section for outputting manga-style image by overlaying the structure lines and the manga-style screening.

Another aspect of the disclosure is to provide a method of generating line drawing from an input image comprises: detecting edge lines from the input image; calculating a importance value of each of the edge lines; and obtaining structure lines by removing lines with importance values smaller than a threshold.

Another aspect of the disclosure is to provide a method of generating a manga-style screening from an input image comprises: extracting segments from the input image; matching a screen type to each of the segments based on the texture similarity mapping and the chrominance distinguishability mapping; and assigning a luminance consistent screen to each segment.

DETAILED DESCRIPTION

Hereinafter, a detailed description will be given with reference to the appended drawings.

Figure 1:
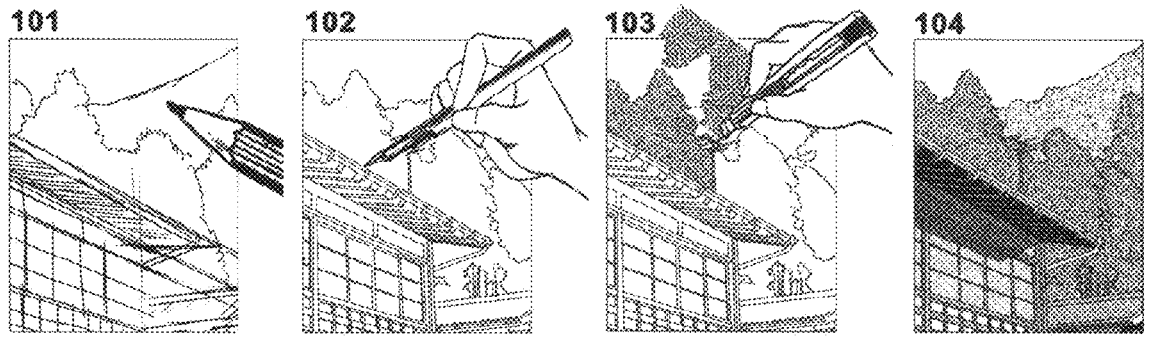
FIG. 1 shows the typical workflow of manga background production.
Figure 2:
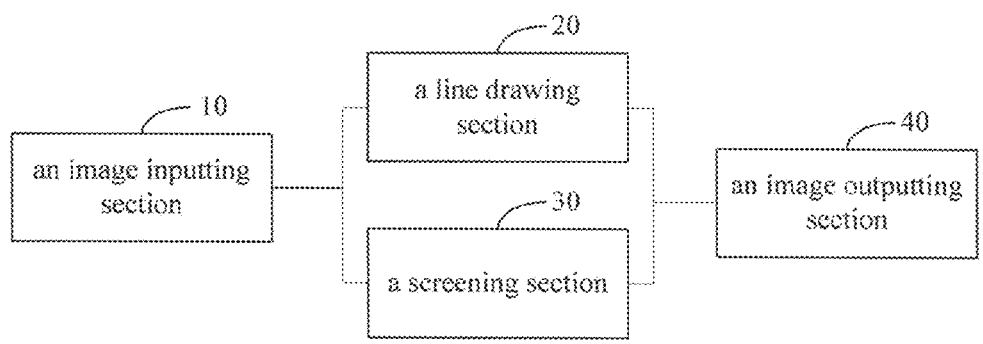
FIG. 2 is a block diagram of an image processing apparatus in accordance with an embodiment of the present application.

FIG. 2 is a block diagram of an image processing apparatus in accordance with a first embodiment of the present application. The image processing apparatus comprises an image inputting section 10, a line drawing section 20, a screening section 30, an image outputting section 40. The image inputting section 10 reads an original image. The line drawing section 20 generates structure lines from the input image. The screening section 30 generates manga-style screening from the input image. The image outputting section 40 outputs a manga style image by overlaying the structure lines with the manga-style screening.

The image inputting section 10 is implemented by an image reading apparatus, such as a scanner, a copying machine, and a camera. It may also be implemented by an apparatus for reading an image from an medium, such as a CD-ROM (compact disk-read only memory), a hard disk, a floppy disk and a magneto-optical disk, which contains an image previously read from an original, as well as by a semiconductor memory.

The image outputting section 40 is implemented by an image displaying apparatus, such as a CRT (cathode ray tube) and an LCD (liquid crystal display). It may also be an image printing apparatus such as a printer. Further, it may also be implemented by an apparatus for writing out an image on ar medium, such as a CD-ROM, a hard disk, a floppy disk and a magneto-optical disk, as well as by a semiconductor memory.

The line drawing section 20 and the screening section 30, are implemented, for example, by a computer and software.

Figure 3:
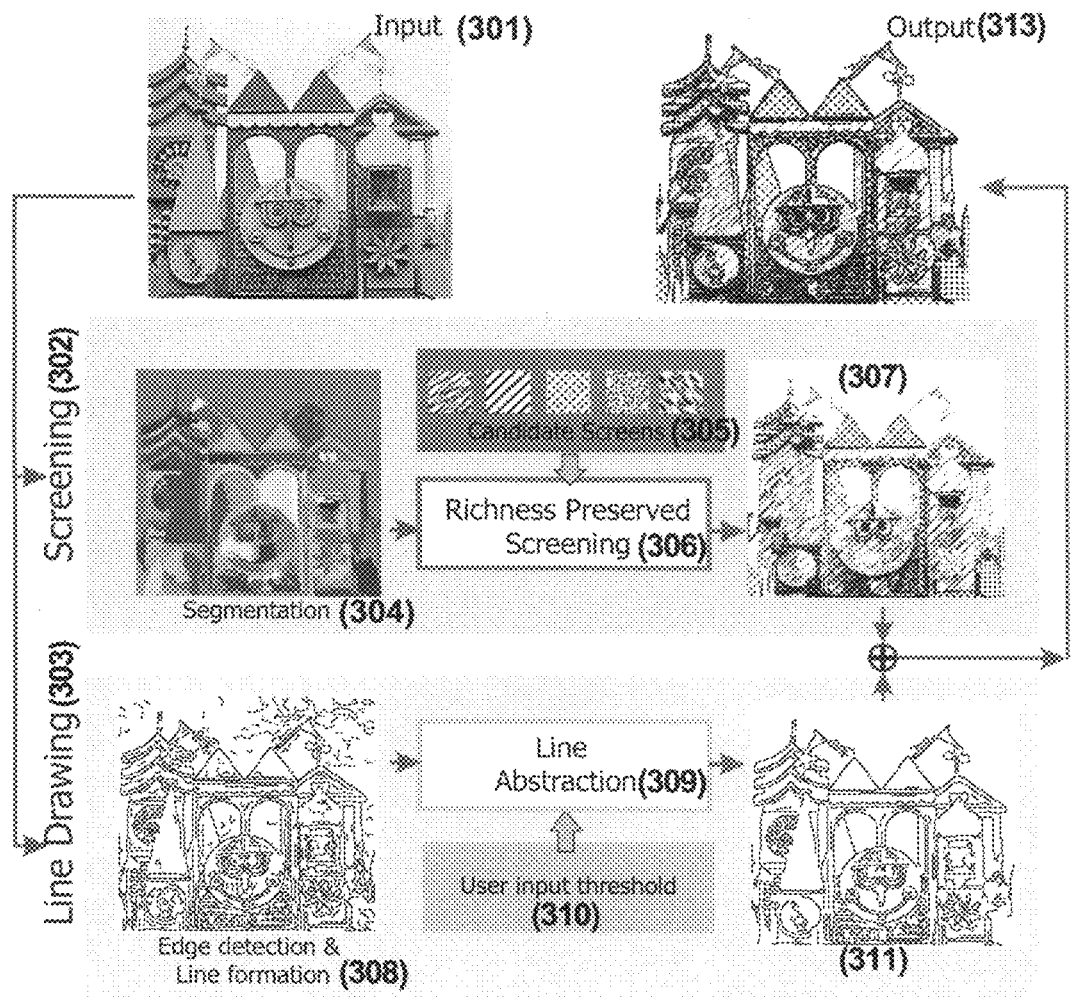
FIG. 3 is a schematic graph showing the image processing method.

FIG. 3 is a schematic graph showing the image processing method. As shown in FIG. 3, the image processing method comprises inputting an original image in step 310; generating a line drawing from the input image in step 320; generating a manga-style screening from an input image in step 330; and outputting the manga-style image by overlaying the line drawing and the manga-style screening in step 340.

Line Drawing

Hereinafter, we will describe the line drawing method implemented by the line drawing section of the present application in detail.

The lines drawn by manga artists are usually tidy and without being too crowded or chaotic. They intentionally omit many detail lines in order to maintain the tidiness of the manga. Usually, all structural lines are retained. This reveals that some lines are more important than others, and these lines usually form the main structure of an object or building.

Several attempts have been done for mimicking artistic line drawings in a computational way. Santella and DeCarlo (Visual interest and NPR: an evaluation and manifesto. In Proc. of International Symposium on Non-Photorealistic Animation and Rendering 2004 (NPAR), pp 71-78) proposed a system that transforms images into a line-drawing style using large regions of constant color; this style is very different from the painterly approaches of previous image-based work, and perhaps more closely approximates the style of printmaking. Holger (Real-time Video Abstraction, ACM Transactions on Graphics (Proceedings of ACM SIGGRAPH 2006) Vol. 25, No. 3, pp 1221-1226) then extended this work by presenting an automatic and real time video and image abstraction framework. A similar visual style was used in the film Waking Life for producing "loose and sketchy" animation (CURTIS, C. 1999. Non-photorealistic animation. In ACM SIGGRAPH 1999 CourseNotes #17 (Section 9)). Recently, several researches have proposed the automatic stylization for the goal of effective visual communication, so that the presented visual contents can be understood quickly and easily (RASKAR, R., TAN, K.-H., FERIS, R., YU, J., and TURK, M. 2004. Nonphotorealistic camera: depth edge detection and stylized rendering using multi-flash imaging. ACM Transactions on Graphics. Vol. 23, No. 3, pp 679-688). For example, Gooch et al. (Human facial illustrations: Creation and psychophysical evaluation. ACM Transactions on Graphics. Vol. 23, No. 1, pp 27-44) automatically created monochromatic human facial illustrations from Difference-of-Gaussian (DoG) edges and a simple model of brightness perception. Hong (HONG Chen, Ziqiang Liu, Chuck Rose, Yingqing Xu, Heung-Yeung Shum, David Salesin: Example-based composite sketching of human portraits. In Proc. of International Symposium on Non-Photorealistic Animation and Rendering 2004 (NPAR), pp 95-153) and his research group proposed an example-based composite sketching of human portraits that automatically generates human portraits in cartoon style.

Different from existing work, our target result is dedicated to manga drawing. Our goal is to properly filter unimportant or detailed lines from the result of conventional edge detection methods, so to produce a tidy line drawing result. To achieve the goal, we try to find a mathematical way to measure the relative importance of each line, and this leads to our line importance model. In the model, we try to address the structural semantics of a line. In contrast to simply portrait auto-generation, our work focuses more on the general manga and cartoon style rendering. The dedicated work can speed up the whole production process and reduce the cost comparing to the labor intensive workflow.

Figure 4:
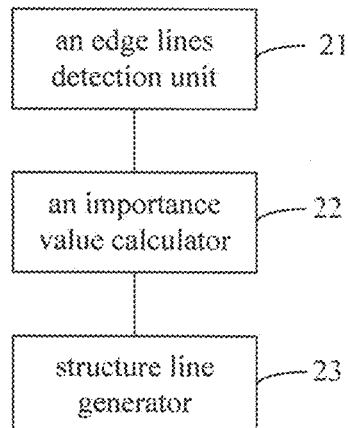
FIG. 4 is a block diagram of a line drawing section of the image processing apparatus.
Figure 5:
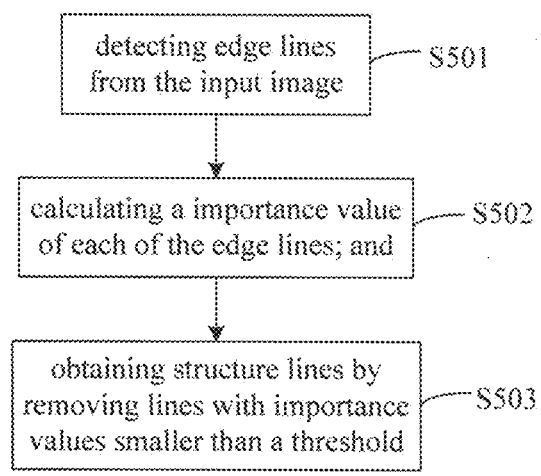
FIG. 5 is a flow chart showing the line drawing method.

FIG. 4 is a block diagram of the line drawing section 20. The line drawing section 20 includes an edge lines detection unit 21, an importance value calculator 22 and a structure line generator 23. FIG. 5 is a flow chart showing the line drawing method. As shown in FIG. 5, the edge lines detection unit 21 is used to detect edge lines of the input image in step S510; the importance value calculator 22 is used to calculate an importance value of each edge line in step S520; and the structure line generator 23 is used to generate structure lines by removing lines with importance values smaller than a threshold in step S530.

Figure 6:
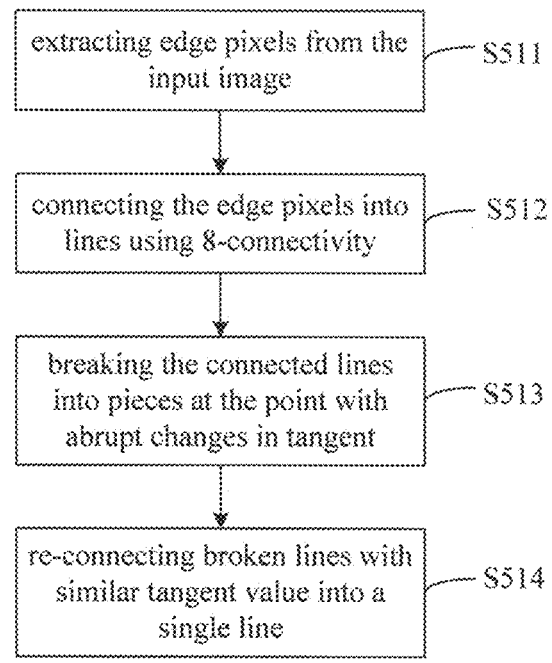
FIG. 6 is a flow chart showing the edge lines detection steps.
Figure 7:
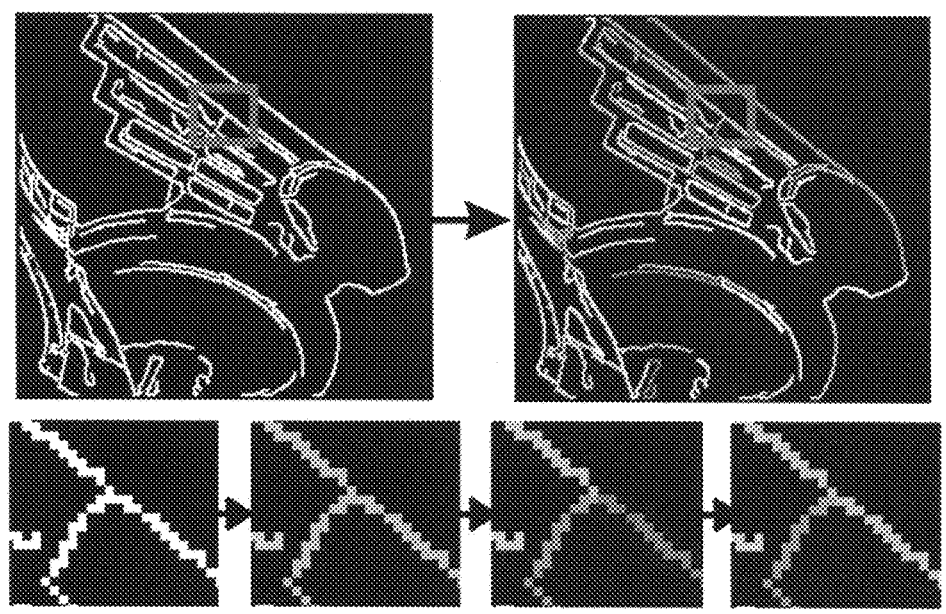
FIG. 7 is a schematic graph showing an edge lines detection result.

FIG. 6 is a flow chart showing the edge lines detection steps. FIG. 7 is a schematic graph showing an edge lines detection result.

To detect edge lines from the input image in step S510, edge pixels are first extracted from the input image in step S511 using an edge detection method, e.g. the classical canny detector or an improved method like (MEER, P., AND GEORGESCU, B. 2001. Edge detection with embedded confidence. IEEE Transactions on Pattern Analysis and Machine Intelligence 23, 12, 1351.1365), which is capable to detect consistent results even on weak edges. The detected edge pixels however are only a set of unstructured entities, as illustrated in FIG. 701. FIG. 702 shows an enlarged portion of the red box in FIG. 701.

The edge pixels are then connected to form an intermediate result. For example, the edge pixels are then connected by using 8-connectivity to produce an intermediate result in step S512. The intermediate result is shown in FIG. 703.

To resemble lines drawn by artist which usually contain no branching or self-intersection, we break the lines into pieces at the point where there is an abrupt change in tangent in S513. For example, the green line in FIG. 703 is broken into three lines in FIG. 704: the green one, the red one and the purple one. The result in FIG. 704 is over-broken at this point, where the semantic of the green one and the red one are belong to a straight line.

To avoid being over broken, we reconnect the broken lines with similar tangent value in S504. For example, the green line and the red line in FIG. 704 have the same tangent value, therefore we reconnect them into a single line (the green line), as shown in FIG. 705. We refer the final result as a line map, as shown in FIG. 706.

However, the edge lines formed in step S510 are far from satisfactory. Many noisy edges exist. Therefore, we propose a model to measure the importance value of a line, so that unimportant lines can be filtered away.

In an embodiment of the present application, the importance value of a line e can be calculated based on the factors including a length $l_e$ of the line, a curliness $\zeta_e$ of the line, and a visibility value $\rho_e$. In addition, a size of largest associated segment $s_e$ can also be used to calculate the importance value.

Figure 8:
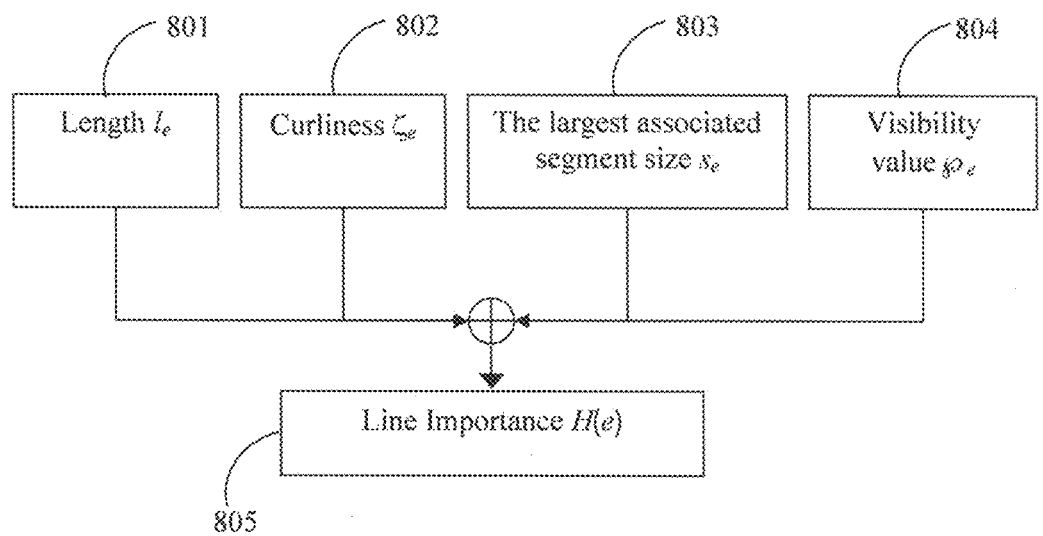
FIG. 8 shows the method of calculating an importance value of each of the edge lines.

FIG. 8 shows the method of calculating an importance value of each of the edge lines.

In step 801, the length $l_e$ can be obtained by counting the number of pixels on a line. In step 802, we measure the curliness $\zeta_e$ by computing the deviation of curvatures of each edge pixel on the line. In step 803, we identify the structural lines by measuring the size of a largest segment, $s_e$ associated with the line e. The size of a segment can be obtained by counting the number of pixels of the target segment. Here, the segment is formed by using a conventional segmentation method, or a segmentation method which will be described in detail in the screening method portion. The curvature at each pixel can be estimated from the fitted polylines. The visibility level $\rho_e$ in step 804 is computed by first forming an image pyramid, and lines with a counterpart in higher level have a larger visibility value. To be specific, we initialized $\rho_e$ with 1, and detect the counterpart of each line in a higher level of the image pyramid, a successful counterpart will increate $\rho_e$ with 1, otherwise 0.

In step 805, the importance value of a line e is calculated based on the factors including a length $l_e$ of the line, a curliness $\zeta_e$ of the line, a size of largest associated segment $s_e$, and a visibility value $\rho_e$. For example, the importance value H(e) of a line e can be defined as, $$H(e)=K(l_e,\zeta_e,s_e,\rho_e)=f(l_e)+g(\zeta_e)+\beta f(s_e)+\alpha\rho_e \quad (1)$$

where $f(x)$ is an increasing function, that increases non-linearly with the segment size. One of the example implementations of $f(x)$ is a Lorentzian function:

$$f(x) = \log\left(1 + \frac{1}{2}\left(\frac{x}{\sigma}\right)^2\right) \quad (2)$$

and g(x) reduces the importance of twisted lines according to the curliness $\zeta_e$. One of the example implementations of g(x) is:

$$g(x)=\min(\lambda e^{-x}, T_g) \quad (3)$$

Wherein threshold $T_g$ is adjustable and upper bounds g(x). $\alpha$, $\beta$, and $\lambda$ are the weights of the contributing factors.

Figure 9:
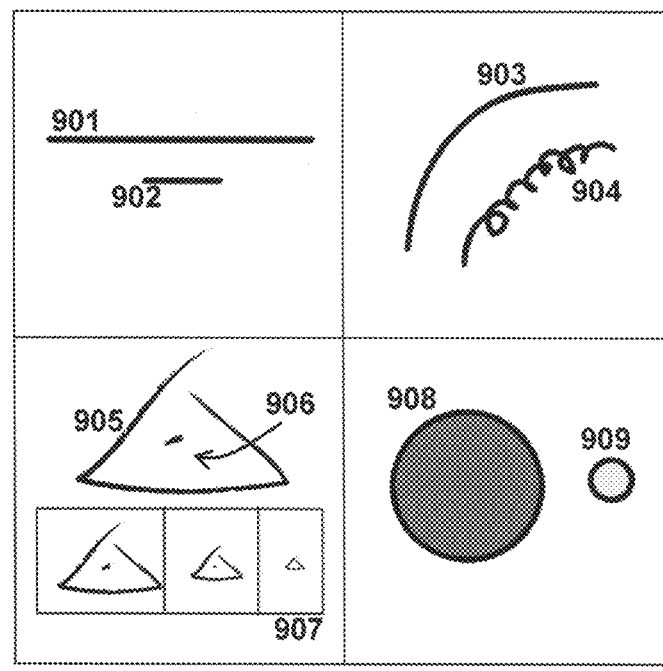
FIG. 9 is a picture showing further details and explanation regarding Equation (1).

FIG. 9 provides further details and explanation regarding Equation (1). In specific, line 901 is more important than line 902, because it's longer. Line 903 is more important than line 904, because line 904 is too curly to be a structural line. Line 905 is more important than line 906, because when scale the image down, as shown in FIG. 907, line 906 disappears, and line 905 is still visible. Line 908 is more important than line 909, because the associated segment (the green region) is larger in size than the yellow region, which associated with line 909.

Figure 10:
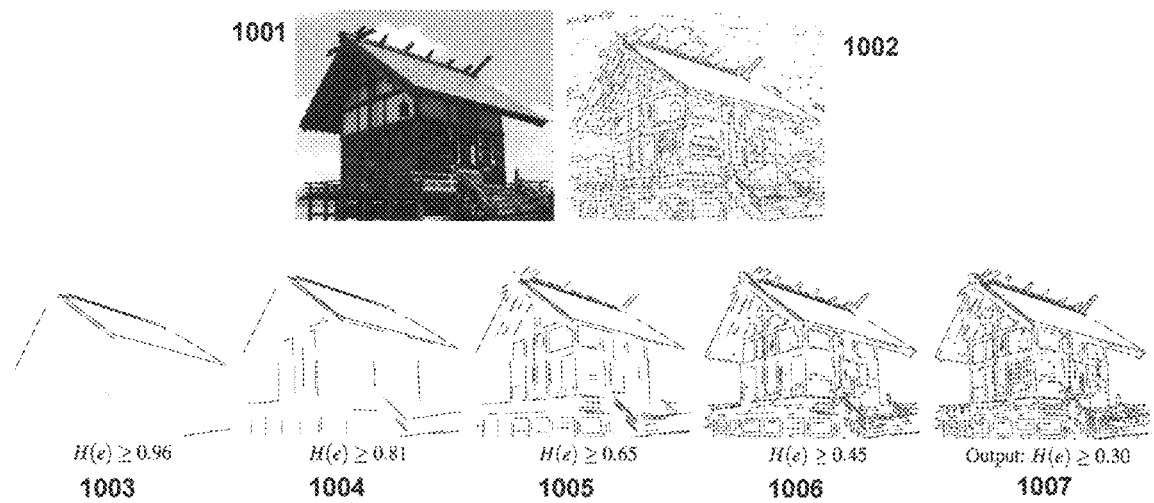
FIG. 10 shows level of line abstraction based on the line importance value.

In order to produce a tidy line drawing result, those lines with importance values smaller than a threshold are removed from the edge lines, so that only the important structural lines are left. The threshold may be set according to the practical implementation. FIG. 10 shows level of line abstraction based on the threshold of the line importance value. With the proposed line importance model in Equation (1), we can generate the lines with a desired degree of abstraction to simulate manga drawing. Figures 1003-1007 show five different levels of abstraction by setting the threshold value on H(e). Image 1002 shows the unstructured edges from the raw edge detection result. If the threshold is set with higher value, for example 0.96, only the main structure lines are kept as shown in figure 1003. By lower the threshold of the importance value H(e) (as shown in figure 1004-1007), more details are added. In this example, figure 1007 shows a nice result with proper details with most of the noisy lines filtered, comparing with figure 1002.

Screening

Hereinafter, we will describe the screening method implemented by the screening section in detail.

Figure 11:
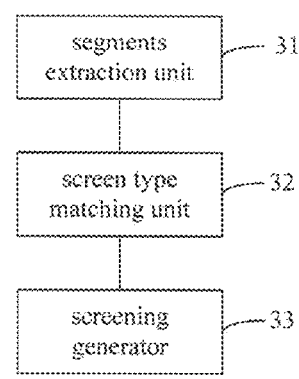
FIG. 11 is a block diagram of the screening section.

FIG. 11 is a block diagram of the screening section 30. In an embodiment, the screening section 30 of the present application comprises a segments extraction unit 31, a screen type matching unit 32, and a screening generator 33.

Figure 12:
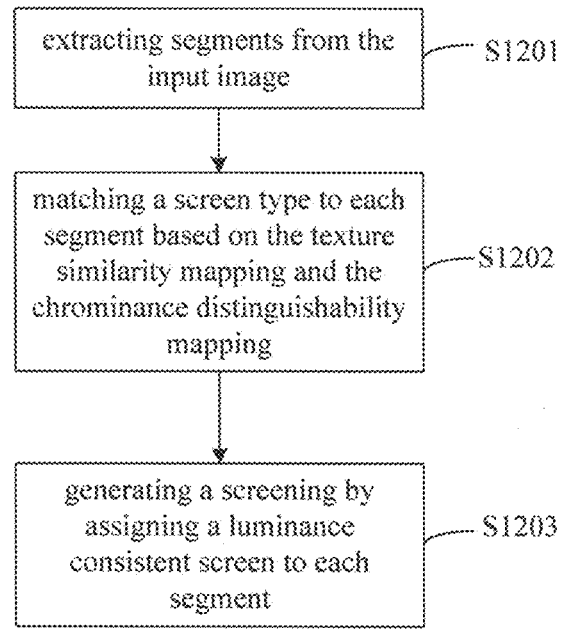
FIG. 12 is a flow chart showing the screening method.

FIG. 12 is a flow chart showing the screening method. As shown in FIG. 12, the segments extraction unit 31 is used to extract segments from the input image in step S1201, the screen type matching unit 32 is used to match a screen type to each segment based on the texture similarity mapping and the chrominance distinguishability mapping in step S1202, the screening generator 33 is used to generate a screening by assigning a luminance consistent screen to each segment in step S1203.

In an example, the extracting step S1201 could be a standard segmentation method for segmenting. In another example, the extracting method could include segmenting the input image to produce small segments; and regrouping the small segments to form larger segments for screening. The re-grouping could be performed according to the similarity of color and distance between regions. This regrouping is optional to avoid over fragmentary segments.

For example, by assuming š regions is obtained after a standard mean-shift segmentation method on a color image I(x,y). The steps for re-grouping can be summarized as follows:

1. The re-grouping criteria is based on both the color ($color_a$ & $color_b$) and spatial distance $dist_{ab}$ between segments a and b, we define a similarity metric $\Psi_{a,b}$ as a weighted average between the color and spatial difference. And a possible way is listed here:

$$\Psi_{a,b}=w_c|color_a-color_b|+w_d dist_{ab}$$

where $w_c$ and $w_d$ are the weighting given to color and spatial difference.

2. A re-group is performed whenever the similarity metric $\Psi_{a,b}$ is lower than a user defined threshold. As a result, segments a and b will be unified as a single segment if similarity metric smaller than the threshold.

3. The re-grouping repeats iteratively until no further re-group is possible, and finally a number of segments can be obtained.

As a result, we can obtain a segmentation map similar to 304 which is a segmentation result of input 301. As the segmentation map is indicating each pixel's segmentation, it is with same size as original input and spatially one-one correspondence for each pixel.

After extracting segments from the input image in step S1201, we can match a screen type to each segment based on the texture similarity mapping and the chrominance distinguishability mapping in step S1202.

The matching step S1202 assigns a screen type to a segment exhibiting texture characteristics. To quantify the texture characteristics, we are required to employ a texture analysis technique to form a texture feature vector. In particular, we can use the Gabor wavelets features, which captures characteristics of textures in various scales and rotations. Usually, the texture feature vector will be a high dimensional one, for example ranging from 10 to 30.

Therefore, screen pattern with minimum difference, in terms of the texture feature vector, to a segment is considered as the best match.

Figure 13:
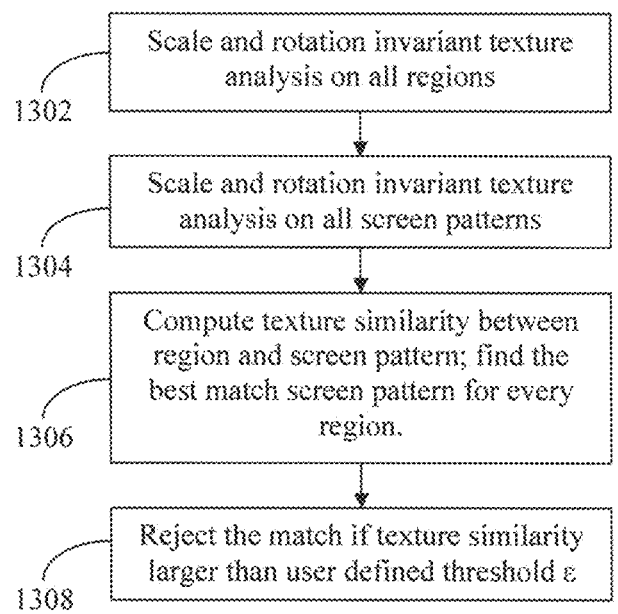
FIG. 13 is a flow chart showing the texture similarity based matching.

The detail steps of texture similarity based matching are described in FIG. 13 and as follows.

In an embodiment, a color image I(x,y) is inputted and performed a segmentation method to constitute a segmentation map including $\phi$ number of segments. In addition, a database is provided with all kinds of screen types c.

In step 1302, for each of the segment s, we compute its texture feature vector $g_s$ by averaging the texture feature vectors computed at all pixels or from a percentage of randomly sampled pixels. The texture feature vector may be a conventional texture feature vector, for example, a Gabor wavelet feature.

If Gabor wavelet feature is used as the texture feature vector, at each sampled pixel, the Gabor wavelet feature [$\mu_{m,n}$, $\sigma_{m,n}$] is computed with following formulation, $$\mu_{m,n} = \iint |W_{m,n}(x,y)| dx dy$$

$$\sigma_{m,n} = \sqrt{\iint (|W_{m,n}(x,y)| - \mu_{m,n})^2 dx dy} \quad (4)$$

where $W_{m,n}(.)$ is the mother Gabor wavelet. For example, 6 rotations and 4 scales is suggested, i.e. m=1, . . . , 6; n=1, . . . , 4. As a result, the Gabor wavelet feature [$\mu_{m,n}$, $\sigma_{m,n}$] is a 24 dimensional vector. The computation operates within the window $\Omega$, a window size of 16×16 is advised. Note, the feature computation is performed on the grayscale of image I(x,y). Then, we can obtain texture feature vector $g_s$ for each segment s by averaging all or a percent of sample's Gabor wavelet features [$\mu_{m,n}$, $\sigma_{m,n}$].

In step 1304, same as in the above point 2, each screen type c of the database performs a texture feature computation and results in texture feature vector $g_c$.

In step 1306, the difference in texture characteristics is then quantified by distance between $g_s$ and $g_c$. Any reasonable distance measuring method can be used. Euclidean distance is one of the possible distances we can consider, i.e. $D_{sc}=|g_s-g_c|$. The best match for segment s is one with minimum $D_{sc}$, i.e. $\min(D_{sc})$.

In step 1308, the match is rejected when $\min(D_{sc})>\epsilon$, otherwise, the screen type c corresponding to the $\min(D_{sc})$ is assigned to the segment s. As there is always a $\min(D_{sc})$, we will reject a match whenever the difference in texture feature vectors is larger than a user defined threshold $\epsilon$, so as to filter some in fact unmatched screen types.

Figure 14:
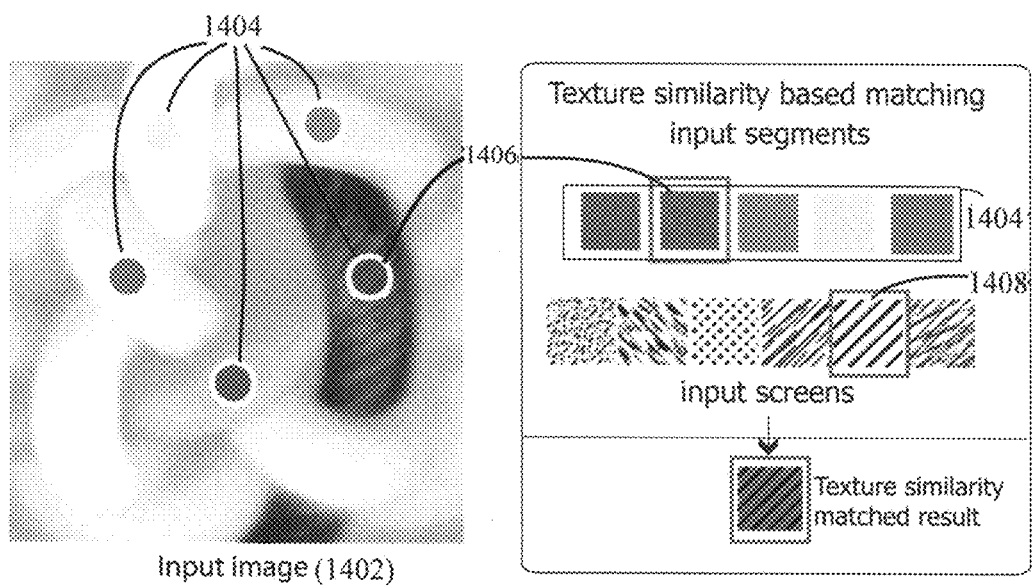
FIG. 14 shows the texture similarity based matching input segments.

For example in FIG. 14, we have five segments as indicated in 1404. We first handle the region 1406 (the purple segment), and try to seek a match from the input screen patterns. We compute the texture feature of the purple segment. By averaging the texture feature vectors from the samples within segment, we have the representative texture feature vector. The same apply to all the input screen types defined by the user as well. Then, we find the best match by comparing all the differences $D_{sc}$ in texture feature between the segment 1406 and all the available screen types. Finally, we check against the best match screen type 1408 to see if $\min(D_{sc})<\epsilon$. In this case, as the texture features are very similar, it is not being rejected by the user threshold $\epsilon$. Other segments in 1404 can not find a match as there is no texture characteristics in the segment, so all best matched screen types are rejected.

After the screen type matching based on the texture similarity, we can match screen types, based on the chrominance distinguishability, to segments without an assigned screen type in the texture feature based matching.

The chrominance distinguishability based matching assigns every segment with a screen type according to the chrominance of a segment. The assignment aims to maintain the visual richness after screening. In more specific, when a color image has rich variety of colors, a rich variety of screen types is expected after screening; in contrast, we will keep using similar screen types for an image with less color variation.

Figure 15:
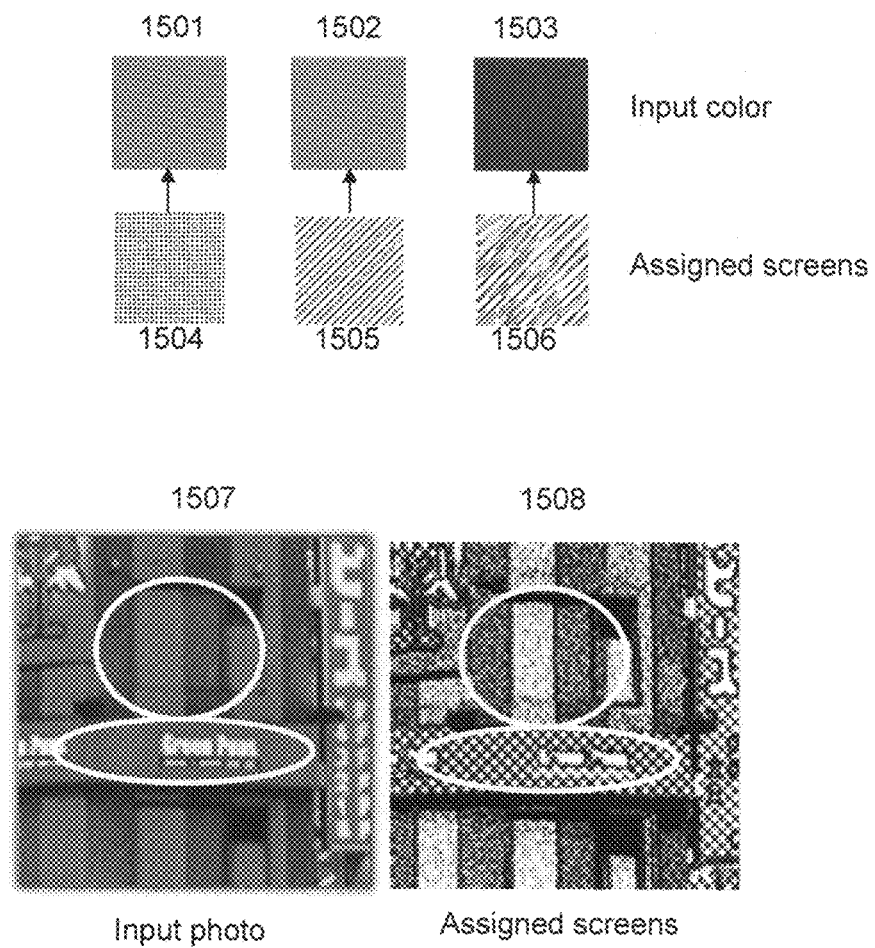
FIG. 15 shows the chrominance distinguishability based screen matching.

As shown in FIG. 15, suppose there are three target color regions in the target image, the red 1501, the orange 1502, and the blue 1503. The idea is to use different type of screens to represent these three colors, e.g. the screen "grid" 1504 is used to represent red color; the screen "regular line" 1505 is used to represent orange color; and the screen "hatching" 1506 is used to represent blue. So that after screening, these three target regions still remains distinguishable because of the patterns on them are different. For example in input photo 1507, there are different colors on the building: the red and green regions as shown in circle regions. In result 1508, they are still distinguishable, because they are represented by different patterns: the "grid" pattern for red, and the "random noise" pattern for green.

In this step we can use mapping technique to correlate the objective colors with screen patterns in the database. For example, screens can be non-repeatedly randomly assigned to the target color region (A); we can also assign screens to colors by their sorting in 1D space (B) or 2D space (C), according to various relative distances measure.

(A) Stochastic Chrominance Based Matching

To assign screen types to segments according to their chrominance, we can rely on a stochastic assignment approach.

In order to better preserve a consistent appearance to the original image, we are not randomly assigning screen types to different segments. Instead, we first collect all different segment chrominance, and then perform a match for every different chrominance value to a randomly selected screen. The detail procedures are described as following:

1. Suppose there are t different screen types and we have $\overline{S}$ segments without a pre-assigned screen type in the texture feature based matching step, out of a total of $\hat{S}$ segments. Then, we collect different chrominance values from these $\overline{S}$ segments to form a set $\overline{C}$.

2. Each chrominance value $\overline{c}$ from $\overline{C}$ is going to match with one of the t screen types randomly. A uniform distributed random number generator can be used to keep the exposure of screen types as even as possible.

3. The matched screen type $\tau$ to a particular chrominance value $\overline{c}$ is then assigned to the segments in $\overline{S}$ with segment chrominance as $\overline{c}$. This procedure repeats for all matched screen type $\tau$.

(B) Relative Distance Preserving Screening—Based on Sorting

Figure 16:
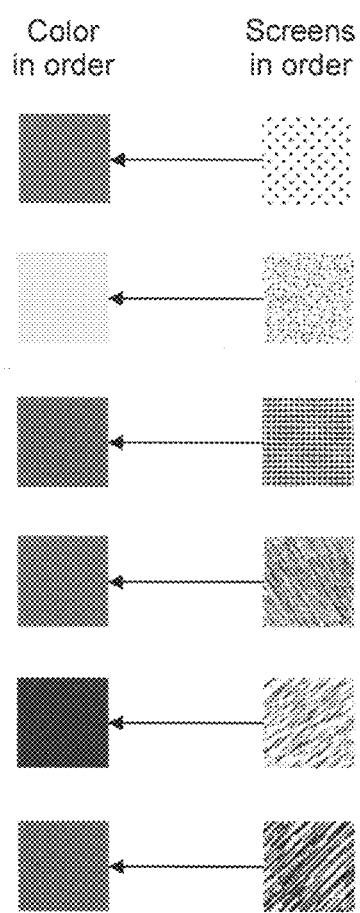
FIG. 16 shows the screens and target color regions.
Figure 17:
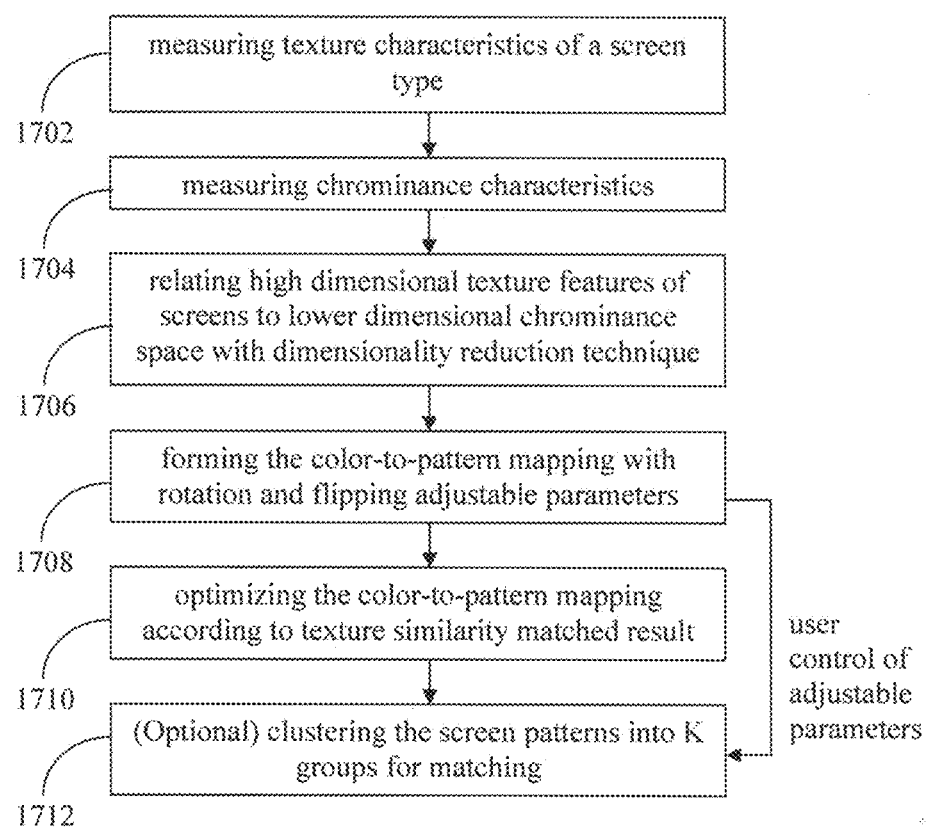
FIG. 17 is a flow chart showing relative distance preserving screening based on multi-dimensional scaling.

To better preserve the relative difference between colors during screening, we can sort both colors and screens in their own order, and then assign screens to color regions according to the sorting. As shown in FIG. 16, all color regions are sorted by their chrominance difference, and all texture screens are sorted by their texture feature difference. We can simply assign the $i^{th}$ screen to the $i^{th}$ color, and in this way the screen difference will basically represent the color difference.

The detail procedures are described as following:

1. Suppose there are t different screen types. $p_i$ is the u-dimensional texture feature vector of the i-th screen. We have $\overline{S}$ segments without a pre-assigned screen type in the texture feature based matching step, out of a total of $\hat{S}$ segments. Then, we collect different chrominance values from these $\overline{S}$ segment s, and cluster them into t kinds, to form a set $\overline{C}$.

2. For all color segments, we reset them into a new order by their color difference with red color, which has the Hue value 0. The color value can be Hue value in HSV color space, or a*b* in CIE La*b* color space. Then calculate the Euclidean distance of each color with respect to the red color, and record this distance into DCi. Sort DCi from minimal to maximal, we can get the color set into new order C'.

3. For all screens, we reset them into a new order by their texture difference with respect to the dots pattern, which has uniform distribution on all directions. Calculate the Euclidean distance of $p_i$ with the texture feature vector of dot pattern p_dot, and record this distance into DTi. Sort DTi from minimal to maximal, we can get the screen set into new order T'.

4. Assign T'i to C'i.

(C) Relative Distance Preserving Screening—Based on Multi-Dimensional Scaling

In this embodiment, we relate the chrominance and screen types in a way that the relative differences of chrominance and relative differences of patterns are maintained faithfully by color-to-screen-type mapping.

In color-to-screen-type mapping, the high-dimensional texture feature vector (for example, 24D Gabor wavelet feature) is used for measuring texture characteristics of a screen type (step 1702).

Then, the segment color is measured with chrominance channels in color space (step 1704). For example, we can adopt a*b* channels, which is 2D, in CIE La*b* color space.

Since the chrominance and screen type has different dimensions, we can unify the dimensionality of both spaces and then relate the colors in segments and texture features in screens in step 1706. A dimensionality reduction scheme is required. In particular, we employ the technique multi-dimensional scaling (MDS) [Cox and Cox 1994].

Our goal is to reduce the dimensionality of the high-dimensional texture feature vector to dimension the same as chrominance channels (e.g. 2D in CIE La*b*), while best maintaining the relative distance among features. We describe the details in computing the color-to-screen-type mapping using MDS:

Suppose there are t different screen types. $p_i$ is the u-dimensional texture feature vector of the i-th screen and $d_{ij}$ is the distance between screen types $p_i$ and $p_j$. Let the $q_i$ be the dimension reduced coordinate of $p_i$ in color space. We further assume that the centroid of all data points lies about the origin, i.e.

$$\sum_i^t p_i = 0.$$

MDS formulates the relations between the projected coordinate $q_i$ and $d_{ij}$ in a matrix form as, $$QQ^T = -\frac{1}{2}\left[I - \frac{1}{t}[1]\right]D^2\left[I - \frac{1}{t}[1]\right] \quad (5)$$
$$QQ^T = V\Lambda V^T$$

here, Q is a u×t matrix with columns being the projected coordinate vectors, D is the dissimilarity matrix which stores the feature distances between all pairs of textures $d_{ij}$ and [1] is a matrix with all elements being 1.

Since D is symmetric, so as the whole right hand side of Equation 5. Hence it can be decomposed using singular value decomposition (SVD) as follow, $$Q=V\Lambda^{1/2}, \quad (6)$$

here $\Lambda$ is diagonal matrix with all the eigenvalues. Then, we extract the major components by simply keeping the first u rows and truncating Q in Equation 6 into a u×t matrix $\hat{Q}$. Then, the columns of $\hat{Q}$ give all $q_i$, which are the projected coordinates of the i-th screen type in the u-D chrominance space, e.g. it is 2D in in CIE La*b*.

After the unification of dimensionality, we have to define a scheme to relate the projected coordinates q and coordinates in chrominance space.

According to an embodiment, a simple yet efficient approach is to map a coordinate in chrominance space to the nearest projected coordinates q. For example, the region average color are matched with the screen type with the nearest $q_i$.

If the nearest coordinate mapping is used, such a mapping is dependent to the transformation of projected coordinates q in the chrominance space. In particular, we can fix the scale relationship by normalizing all $q_i$ to [−1,1] in all u dimensions or to the range of all available colors on segments (as in step 1708).

As an option in step 1712, which tries to facilitate user control on the total number of screen types K actually used in the final screening result, it is possible to first cluster all available region average colors. We can perform a K-means clustering on the region chrominance with K being the number of clusters. Then, the centroid of each cluster is used as a representative chrominance to match with the nearest $q_i$.

Region matched with $q_i$ is assigned the i-th screen type.

The color-to-screen-type mapping is not unique, as the MDS only maintains the relative distances. According to another embodiment, we can still transform the mapped coordinates $q_i$ by rotation, scaling, translation, or flipping. These degrees of freedom therefore enable users to adjust for a favorite combination of mapping, and become user controllable parameters. However, it is suggested both scaling and translation are fixed by normalization and zero-mean. The controllable parameters, therefore, left the rotation angle $\theta$ and flip $f$.

An automatic decision (step 1710) on these parameters can be determined by the system based on the texture matched result in earlier procedure. The rationale behind such a decision is trying to resolve conflicts between results in texture feature based matching and color-to-pattern mapping.

Figure 18:
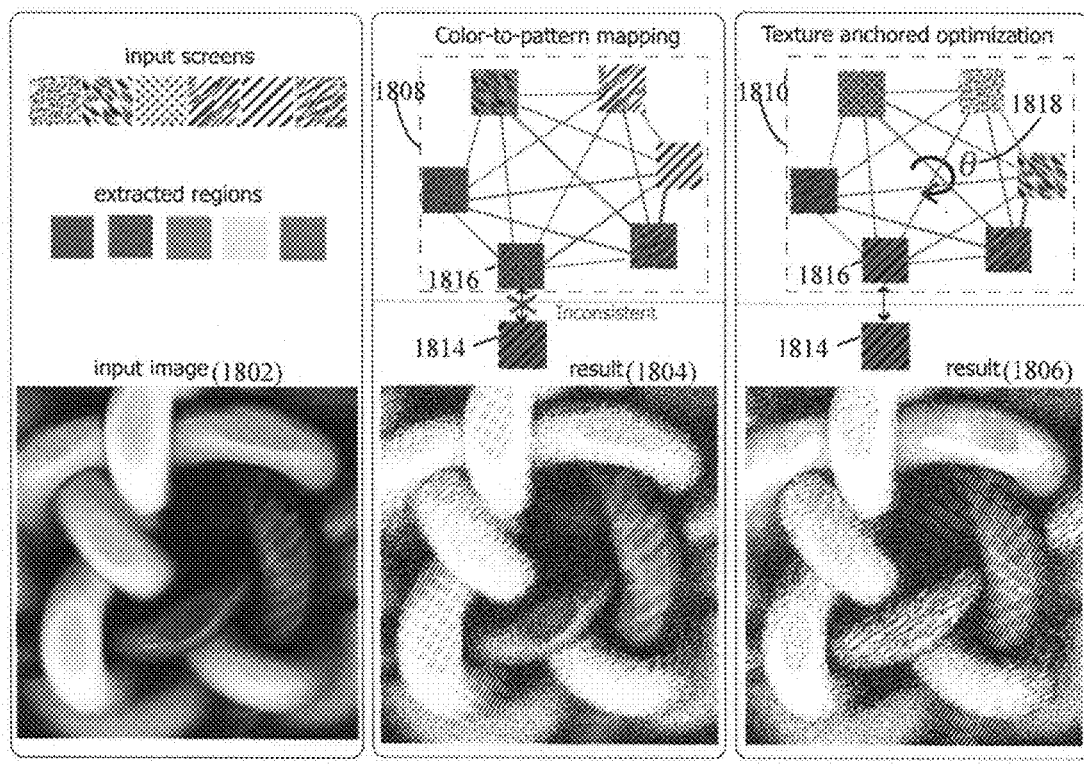
FIG. 18 shows the texture anchored optimization.

For example, FIG. 18 shows that a different screen type is matched to the purple region (1812) when comparing to the screen type matched in FIG. 14. This is because of the configuration 1808 of color-to-screen-type mapping has not consider the texture similarity between screen type and segment. Therefore, the texture anchored optimization is suggested to solve this inconsistency.

We first design an objective function to achieve our desired goal. Our ideal situation is to determine a transformation in color-to-screen-type mapping so that the inconsistency with pre-assignments can be minimized. Therefore, we quantify the inconsistency by the aggregate textural feature differences between current assignment and pre-assignment. Also, we give higher weighting to segments with larger area. The whole optimization is done as follow:

1. Suppose we have S segment with a pre-assigned screen type in the texture feature based matching step, out of a total of $\hat{S}$ segments. $\tau_s$ and C(s) are the pre-assigned screen type in color-to-screen-type mapping and the average color of regions s respectively. $T(\tau)$ is the texture feature for screen pattern $\tau$. Our objective formulation is as follow, $$\sum_s^S (a_s \times |T(Q(\theta, f, C(s))) - T(\tau_s)|)$$

where $Q(\theta, f, C(s))$ is the screen selected via color-to-screen-type mapping given the $$|T(O(\cdot))-T(\tau \cdot)|$$

color C(s), rotation angle θ, and flipping $f$. $a_s$ is the size of region in terms of pixels and $$\sum_s^{\tilde{s}} a_s = 1.$$

So, the term is measuring the textural feature difference between current and pre-assignments. $a_s$ is used as a weighting factor to the importance of this difference.

2. We optimize the transformation by iteratively evaluate the objective function and seek the combination of angle θ and flip $f$ (takes 1 or −1) which achieves a minimum. Or other optimization method whenever applicable.

3. The optimized color-to-screen-type mapping is then applied on all the regions based on the nearest $q_i$. Region matched with $q_i$ is assigned the i-th screen pattern.

In FIG. 18, the inconsistency of region 1812 is solved by adjusting angle θ (1818); so the line screen is now matched as 1816, the same as the result in texture similarity based matching (1814).

Luminance Based Matching Between Regions and Screens

Figure 19:
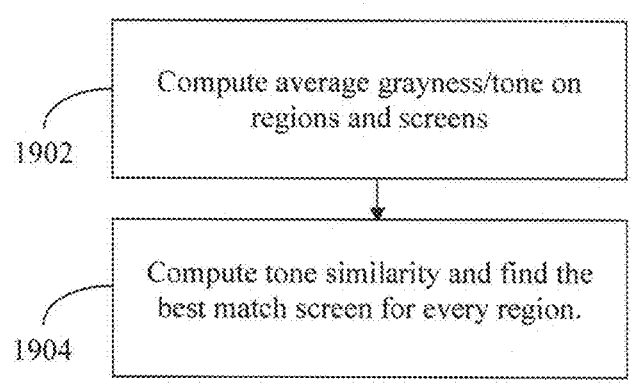
FIG. 19 is a flow chart showing luminance based matching.

Every region s is matched with a screen pattern after the previous procedures. We perform a luminance matching by selecting the appropriate screen tone (horizontal dimension in FIG. 19). First, in step 1902, we compute the average luminance on all regions and screens. Then, we match the overall luminance of the screen with the average luminance of the region as in step 1904.

Figure 20:
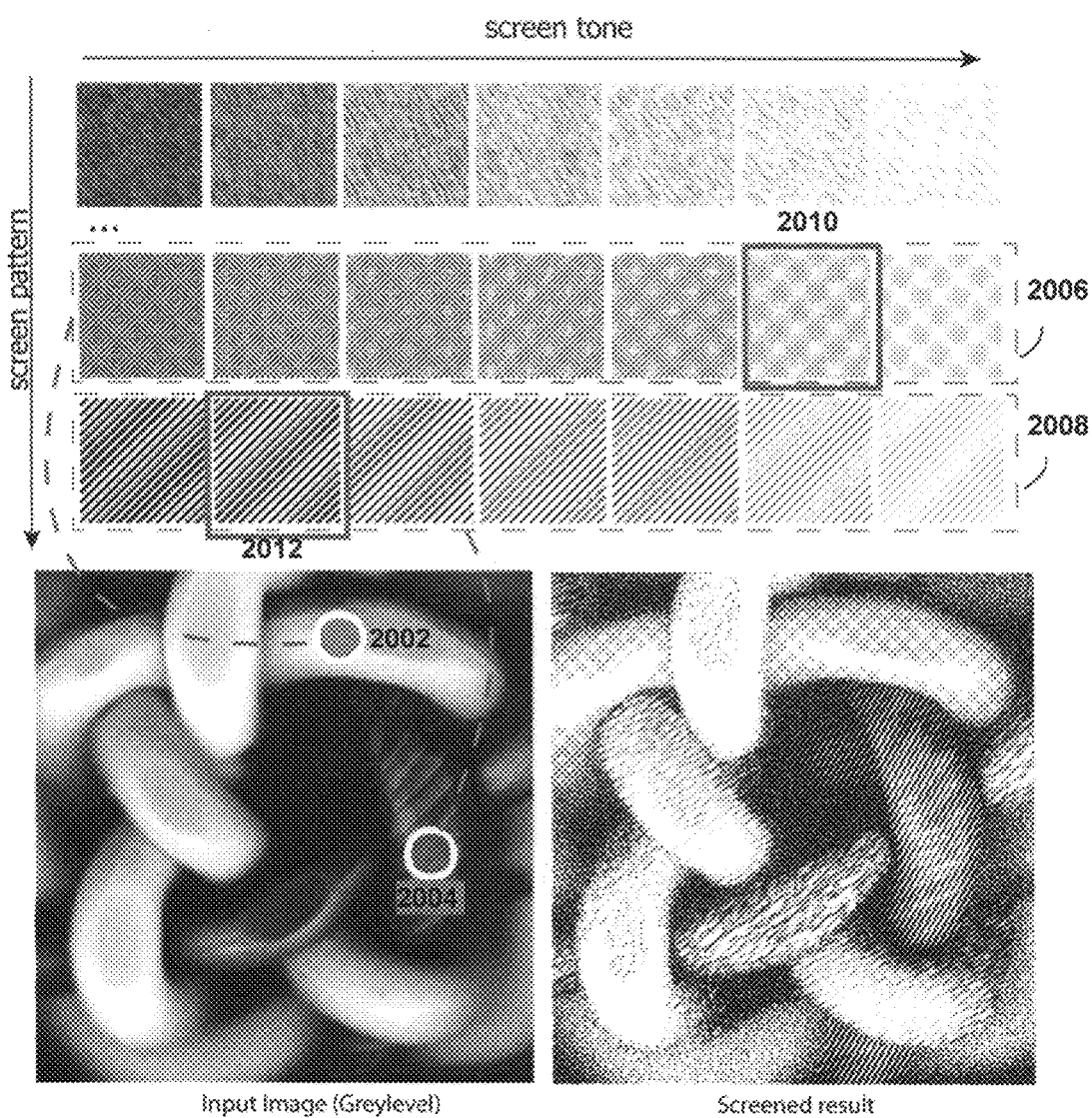
FIG. 20 shows the screening results.

As shown in FIG. 20, region 2002 and 2004 are matched with a screen type in previous matching procedures, and they are screen type 2006 and 2008 respectively. Therefore, region 2002 is going to match a particular screen with a nearest luminance within screen type 2006, and the result is the screen 2010. Similarly, region 2004 performs a luminance matching within screen type 2008 and screen 2012 is the best match.

Our proposed color-to-pattern matching can be applied to any color-to-bitonal image applications that require chromaticity distinguishability. For example, color artwork and cartoon drawing can also be converted to bitonal images. In the manga industry, cartoon (anime) may be published, not only in video form, but also in a manga form. Current practices simply print the cartoon key frames in color, probably due to the high and manual color-to-manga cost. With the proposed method, it is possible to publish the color cartoon in bitonal manga form (lower printing cost) in a style consistent with traditional manga.

For an 800_1000 input image, our system can automatically generate the result in about 4 minutes, on a PC with P4 3.2 GHz CPU, 2 GB memory. This includes the time for segmentation, texture matching, color-to-pattern matching, tone matching, plus the minimal user control.

Special Effects

User Controlled Levels of Detail

With the proposed automatic screening and line abstraction processes, user can still control the desired level of complexity shown in the final manga. As manga artists usually put multiple panels within a page, and each panel has a different size and shape decided according to the relative importance in the storytelling. For instances, larger panels are used for important scenario and smaller ones for transitions. The size of panel obviously affects the desired complexity inside. It is not desirable to draw too much details (e.g. too many lines or too many distinct screen types) in a small panel.

To control the complexity of screens, user can specify a desired number of screens K (as in step 1712) used in the final outcome, e.g. five screens for a complex scene, and two for a simple one. The K-means clustering can automatically optimize for texture similarity and color distinguishability given the desired number of screen types. The operation usually takes just a few seconds for one image. User can also adjust the anchoring of transformation during color-to-screen mapping by controlling the rotation angle θ interactively. For line abstraction, the desired complexity can be interactively controlled by dragging a slide bar that controls the threshold for H(e). Since our system can generate a result instantly, user can interactively fine-tune the user parameters.

Fuzzy Silhouette Tiling

Fuzzy silhouette refers to the boundaries of fuzzy objects, e.g.: the boundary of a furry surface consisting of similar fur structures; or the boundary a leavy tree, where the silhouette is usually scattered with leaves. The idea of fuzzy silhouette tiling is to tile along the lines with small primitives, so as to simulate the fuzzy nature on the target objects.

Figure 21:
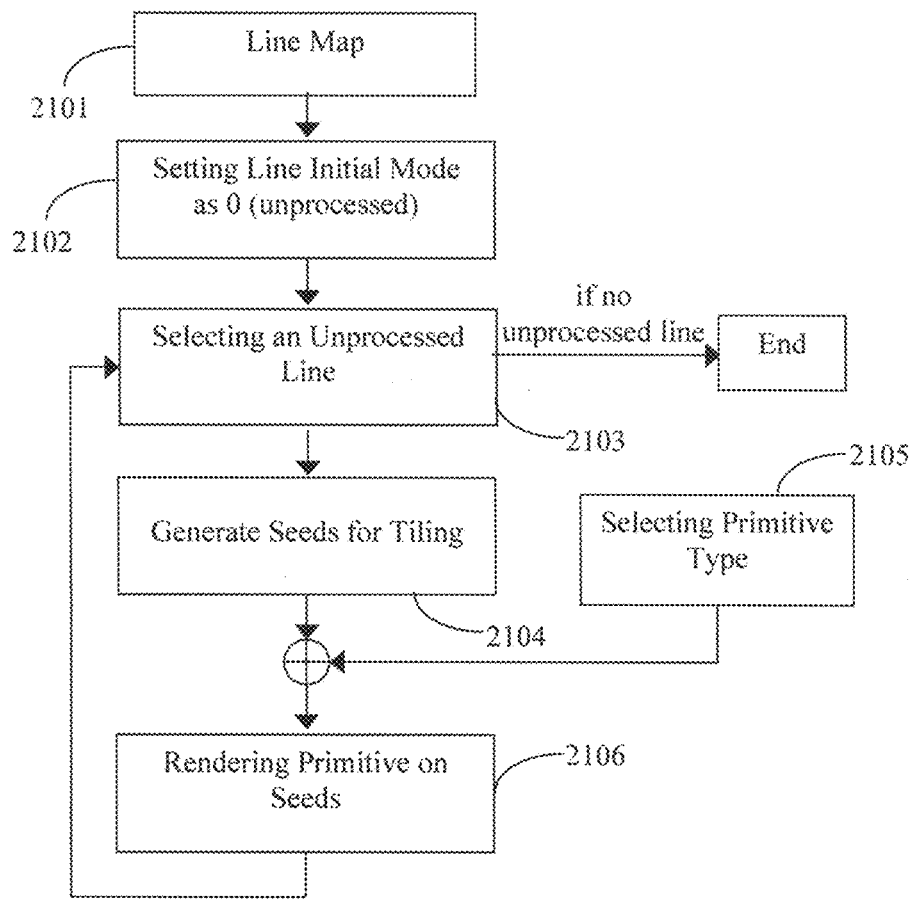
FIG. 21 is a flowchart showing the fuzzy silhouette tiling.

The detail procedure of fuzzy silhouette tiling is explained in FIG. 21.

1. The input of the fuzzy silhouette tiling is a line map, which is the result 406 from the line abstraction procedure.
2. All the lines are processed in one by one manner. We randomly select a line to start the following steps, and repeat the procedure on all other lines.
3. On each line, we first distribute some seeds along the lines, to avoid uneven distribution and being overcrowded (step 2104). The seeds can be placed along the line with an equal distance, or a random distance which could lead to a more natural appearance.
4. Then, our system renders the input line by tiling the desired primitives 1905 along the seeds points on the lines.

Figure 22:
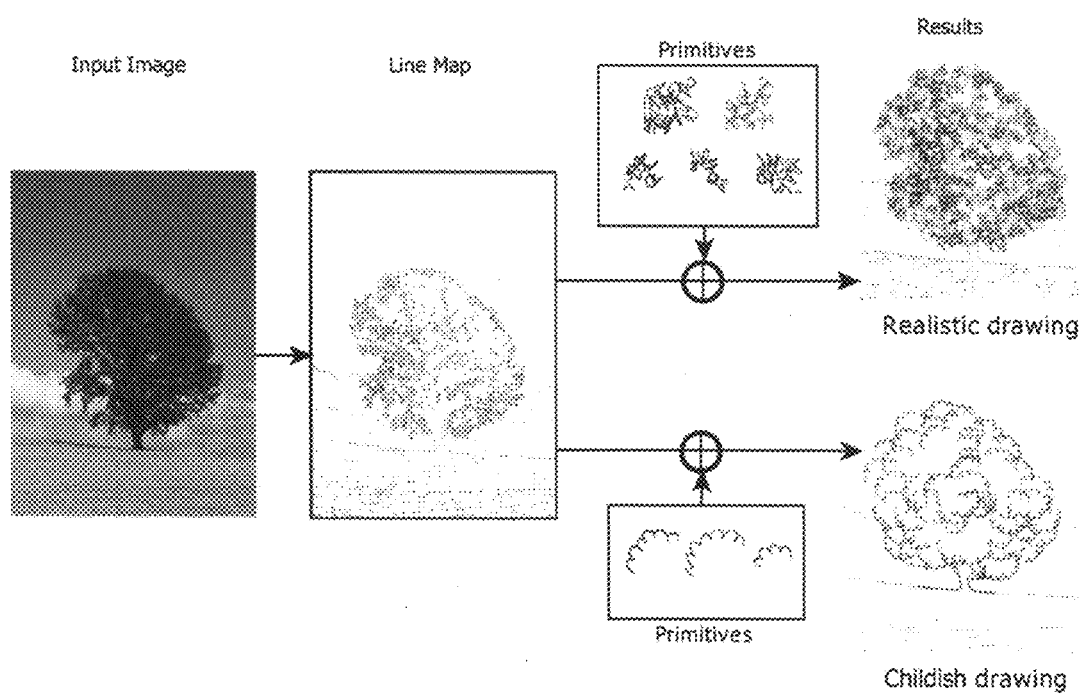
FIG. 22 shows the fuzzy silhouette tiling procedure.

FIG. 22 provides visual examples. To avoid uneven distribution and being overcrowded, in step 1904, some random model can be used to guide the placement of the tiles; For example the Poisson disc distribution can be used to enforce a minimal distance among the tiles.

Screening for Periodic Patterns

Sometimes the same object can be presented in the form of lines as well as screens. This is common for regions containing regular or statistically similar patterns. For example, a brick wall can be hand drawn as lines or screened with a pre-printed brick pattern. Manga artists may prefer screening, not only to save workload, but also to maintain the tidiness. Our system provides a convenient tool for user to replace edge map containing those periodic line structure with a screen. By scribbling on the desired edge region as in FIG. 23 (scribble 2306), we compute the representative Gabor wavelet feature vector on the selected edge region in the edge map as in step 2306 and 2308. This representative feature is then used for selecting screen.

Figure 23:
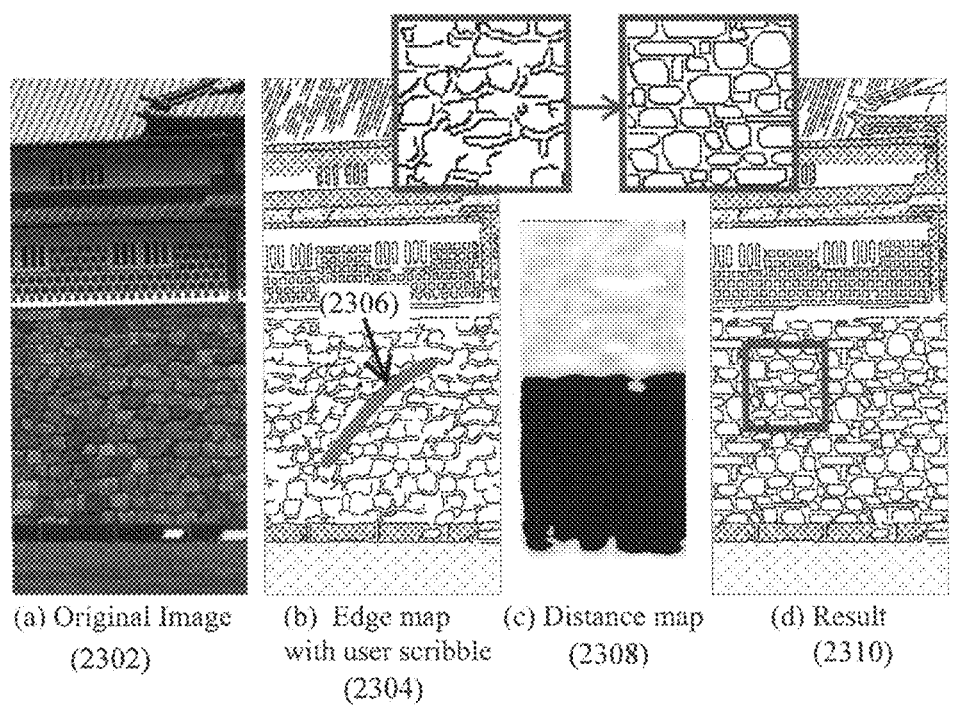
FIG. 23 shows the screening for periodic patterns.

Our objective is to find the best screen pattern which is high in terms of texture similarity. Image 2308 in FIG. 23 shows the best matched screen and its corresponding distance measure, where small distance values are color-coded as black. There are cases that none of the screen types is similar to the region. If the distance of the best match still exceeds a user-defined threshold, no screen is assigned. In order to obtain a tidy and clear-cut boundary, the screening is performed with reference to the segment map and overlaid in a per-segment basis, instead of per-pixel basis. Image 2310 in FIG. 23 shows the final result after the screen replacement.

All the methods as described above may be executed by a processor, a computer or any other processing devices.

The disclosure also provides a computer program including instructions for controlling the execution of the methods as described above, which may be performed with a processor, a computer or any other processing devices.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of generating a manga-style image from an input image, comprising:
   generating a line drawing from the input image;
   generating a manga-style screening from the input image; and
   overlaying the line drawing and the manga-style screening to generate the manga-style image,
   wherein the input image is a color photograph or a color image,
   wherein generating the line drawing from the input image comprises detecting edge lines from the input image, calculating an importance value of each of the edge lines, and obtaining structure lines by removing lines with importance values smaller than a threshold,
   wherein detecting edge lines comprises extracting edge pixels from the input image, connecting the edge pixels into lines using 8-connectivity, breaking the connected lines into pieces at the point with abrupt changes in tangent, and re-connecting broken lines with similar tangent value into a single line.

2. A method of generating a manga-style image from an input image, comprising:
   generating a line drawing from the input image;
   generating a manga-style screening from the input image; and
   overlaying the line drawing and the manga-style screening to generate a manga-style image,
   wherein the input image is a color photograph or a color image,
   wherein generating the line drawing from the input image comprises detecting edge lines from the input image, calculating an importance value of each of the edge lines, and obtaining structure lines by removing lines with importance values smaller than a threshold,
   wherein the importance value of the line is calculated based on factors including a length of the line, a curliness of the line, a size of largest associated segment, and a visibility value of the line.

3. The method of claim 2, wherein the length of the line is obtained by counting a number of pixels on the line; the curliness of the line is obtained by counting the deviation of curvatures of the line at each pixel, and the curvature at each pixel is estimated from fitted polylines; the size of largest associated segment is obtained by counting a number of pixels within the largest associated segment; and the visibility value is computed by first forming an image pyramid, and lines with a counterpart in higher level have a larger visibility value.

4. A method of generating a manga-style image from an input image, comprising:
   generating a line drawing from the input image;
   generating a manga-style screening from the input image; and
   overlaying the line drawing and the manga-style screening to generate the manga-style image,
   wherein the input image is a color photograph or a color image,
   wherein generating a manga-style screening from the input image comprises extracting segments from the input image, matching a screen type to each of the segments based on a texture similarity mapping and a chrominance distinguishability mapping, and assigning a luminance consistent screen to each segment.

5. The method of claim 4, wherein the extracting segments comprises:
   segmenting the input image to produce small regions; and
   regrouping the small regions to form segments according to the similarity of color and distance between the small regions.

6. The method of claim 5, wherein the regrouping further comprises:
   calculating a color-spatial distance between a first region and a second region;
   unifying the first segment and the second segment as a single segment if the color-spatial distance therebetween is lower than a color-spatial distance threshold; and
   iteratively repeating the calculating and unifying until no color-spatial distance is lower than the color-spatial distance threshold.

7. The method of claim 4, wherein the matching a screen type to each segment based on the texture similarity mapping comprises:
   determining a plurality of screen types;
   quantifying a texture feature vector to each of the screen types;
   calculating, for each segment, a texture feature vector based on the texture characteristics of the segment;
   calculating, for each segment, texture-based distances between the texture feature vector of the segment and the texture feature vector of each of the screen types;
   setting a texture-based distance threshold; and
   matching a segment with the screen type with a nearest texture-based distance associated to the segment, if the nearest texture-based distance is lower than the distance threshold.

8. The method of claim 7, wherein the matching a screen type to each segment based on the chrominance distinguishability mapping comprises:
   matching, for a segment of remained segments without matched screen types, a screen type based on a chrominance value of the segment.

9. The method of claim 8, wherein the matching, for a segment of remained segments without matched screen types, a screen type based on the chrominance value of the segment comprises collecting the remained segments into segment groups, wherein the segment groups are matched with a set of available screen types based on a chromaticity distinguishability mapping.

10. The method of claim 8, wherein the matching, for a segment of remained segments without matched screen types, a screen type based on the chrominance value of the segment comprises:
   collecting the remained segments into segment groups, each group having a similar chrominance value;

calculating an average chrominance of each segment group;

respresenting the average chrominance as a coordinate point in a two dimensional chrominance space;

calculating a high-dimensional texture feature vector based on the texture characteristics for each screen type;

representing the high-dimensional texture feature vector as a coordinate point in a high dimensional texture feature space;

reducing a dimensionality of the high dimensional texture feature space to a two dimensional texture feature space; and matching the two dimensional texture feature space with the two dimensional chrominance space.

11. The method of claim 8, wherein the matching, for a segment of remained segments without matched screen types, a screen type based on chrominance value of the segment comprises:

calculating, for each segment of the remained segments without matched screen types, a the chrominance value;

unifying a dimensionality of the texture feature vector of each of the screen types and a dimensionality of the chrominance value by reducing a dimensionality of the texture features space using multi-dimensional scaling;

color-to-screen-type matching a segment of the remained segments with a screen type with a nearest distance between a coordinate of a dimension-reduced-texture feature vector of each screen type and a coordinate of average chrominance value of the segment group; and calculating an objective value based on all pairs of matching.

12. The method of claim 11, further comprising:

optimizing the color-to-screen-type matching by transforming the dimension-reduced texture feature space and seeking a transformation with the minimal objective value, wherein transforming comprises at least one of rotating, scaling, and translating.

13. The method of claim 12, wherein the optimizing is implemented by using objective formulation:

$$\sum_{s}^{S} (a_s \times |T(Q(\theta, f, C(s))) - T(\tau_s)|)$$

where S are segments with pre-assigned screen types in the texture feature based matching, out of a total of Ŝ segments, $\tau_s$ and C(s) are the pre-assigned screen type in texture feature based mapping and the average color of regions s respectively, T(τ) is the texture feature for screen pattern τ, Q(θ, $f$, C(s)) is the current screen type selected via color-to-screen-type mapping given the color C(s), rotation angle θ, and flipping $f$, $a_s$ is the size of region in terms of pixels and $$\sum_{s}^{\hat{S}} a_s = 1.$$

wherein rotation angle θ and flipping $f$ comprise a transformation applied on the dimension-reduced texture feature space.

14. The method of claim 4, wherein the assigning a luminance consistent screen to each segment comprises:

evaluating the luminance of each segment by computing the average luminance or grayness of pixels within the segment; and selecting, for each segment, a screen of the screen type with the closet luminance to the segment.

15. An image processing apparatus, comprising:

an image inputting section configured to input an image;

a line drawing section configured to generate structure lines from the input image, wherein the line drawing section comprises an edge lines detection unit configured to detect edge lines of the input image, an importance value calculator configured to calculate an importance value of each edge line based on factors including a length of the line, a curliness of the line, a size of largest associated segment, and a visibility value, and a structure line generator configured to generate structure lines by removing lines with importance values smaller than a threshold;

a screening section configured to generate manga-style screening from the input image; and an image outputting section configured to output manga-style image by overlaying the structure lines and the manga-style screening.

16. An image processing apparatus, comprising:

an image inputting section configured to input an image a line drawing section configured to generate structure lines from the input image;

a screening section configured to generate manga-style screening from the input image, wherein the screening section comprises a segments extraction unit configured to extract segments from the input image, a screen type matching unit configured to match a screen type to each segment based on a texture similarity mapping and a chrominance distinguishability mapping, and a screening generator configured to generate a screening by assigning a luminance consistent screen to each segment; and an image outputting section configured to output a manga-style image by overlaying the structure lines and the manga-style screening.

17. The apparatus of claim 16, wherein the line drawing section comprises:

an edge lines detection unit for detecting edge lines of the input image;

an importance value calculator for calculating an importance value of each edge line; and a structure line generator for generating structure lines by removing lines with importance values smaller than a threshold.

* * * * *

UNITED STATES PATENT AND TRADEMARK OFFICE
CERTIFICATE OF CORRECTION

PATENT NO. : 8,768,001 B2  
APPLICATION NO. : 12/928401  
DATED : July 1, 2014  
INVENTOR(S) : Tien-Tsin Wong et al.

Page 1 of 1

It is certified that error appears in the above-identified patent and that said Letters Patent is hereby corrected as shown below:

In the Specification

In column 1 at line 51, Change "stytle" to --style--.

In column 3 at line 3, Change "30," to --30--.

In column 5 at line 5, Change "increate" to --increase--.

In column 9 at line 25 (approx.), Change "MDS:" to --MDS.--.

In column 9 at line 60, Change "$\overline{Q}$" to --$\hat{Q}$--.

In the Claims

In column 15 at line 3, In Claim 10, change "respresenting" to --representing--.

In column 15 at line 20, In Claim 11, change "a the" to --the--.

In column 15 at line 56 (approx.), In Claim 13, change "$\sum_{s}^{\tilde{s}} a_s = 1.$" to --$\sum_{s}^{\hat{s}} a_s = 1,$--.

Signed and Sealed this  
Twenty-fourth Day of February, 2015

Michelle K. Lee  
*Deputy Director of the United States Patent and Trademark Office*